Feb. 14, 1933.  H. C. KELLOGG  1,897,559

LIQUID COOLING SYSTEM

Filed April 27, 1928

INVENTOR
BY Herbert C. Kellogg
Evans & McCoy
ATTORNEYS

Patented Feb. 14, 1933

1,897,559

UNITED STATES PATENT OFFICE

HERBERT C. KELLOGG, OF DETROIT, MICHIGAN, ASSIGNOR TO THE RUSS MANUFACTURING COMPANY, OF CLEVELAND, OHIO, A CORPORATION OF OHIO

LIQUID COOLING SYSTEM

Application filed April 27, 1928. Serial No. 273,248.

This invention relates to a liquid cooling system for maintaining a considerable supply of liquid in a storage tank at substantially a predetermined temperature.

Various industrial operations require from time to time a considerable quantity of liquid of predetermined temperature that is immediately available for use.

The present invention has for its object to provide an improved automatically operating economical cooling and storage system by means of which a considerable volume of water or other liquid may be kept at a substantially uniform temperature and be available for use whenever required and that will cause the cooling unit to operate at its maximum capacity regardless of fluctuations in incoming temperature of the liquid being cooled.

A further object is to provide a cooling system in which a relatively small cooling unit may be employed in connection with a liquid storage tank for maintaining a considerable volume of liquid in the tank at the desired predetermined temperature.

With the above and other objects in view, the invention may be said to comprise the cooling system as illustrated in the accompanying drawing hereinafter described and particularly set forth in the appended claims, together with such variations and modifications thereof as will be apparent to one skilled in the art to which the invention appertains.

Reference should be had to the accompanying drawing forming a part of the specification in which.

Figure 1:
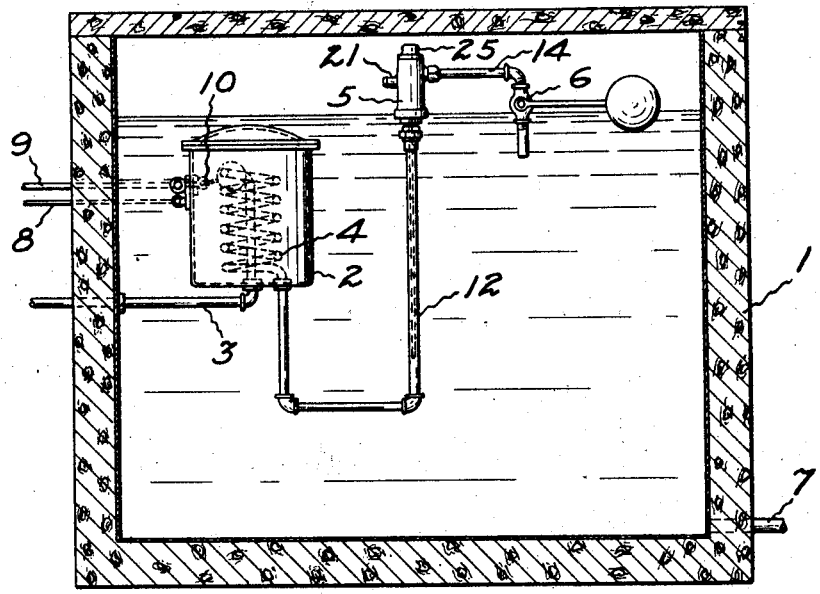
Fig. 1 is a vertical section through a liquid storage tank showing the liquid cooling unit therein.

The liquid cooling and storing system illustrated in the accompanying drawing comprises in general a thermally insulated storage tank 1 within which is mounted a suitable refrigerating unit 2. Liquid is supplied to the system from a supply pipe 3 that connects with a suitable cooling coil 4 within the cooling unit 2. The flow of liquid through the coil 4 of the cooling unit is controlled by a thermally operated valve 5 that insures uniform delivery temperatures of the liquid supplied to the tank. A suitable float controlled valve 6 cuts off the supply of liquid to the tank 1 when a certain quantity of cooled liquid has collected therein. The particular elements used in the above system will next be described in detail.

The capacity of the tank 1 is preferably sufficient to supply the maximum requirements for the particular industrial operation at any given time. Water or other liquid is drawn from the tank when needed through a suitable outlet pipe 7.

The evaporator or boiler 2 which constitutes the cooling unit is mounted within the tank 1 and has the usual liquid refrigerant supply pipe 8 and exhaust or suction pipe 9 respectively connected to the pressure and suction ports of a suitable compressor (not shown) for forcing the liquid refrigerant into the evaporator under pressure and for regulating the pressure above the level of the liquid in the evaporator in order to control the boiling temperature of the refrigerating liquid and thereby control the temperature thereof. As well understood in the art, the level of the refrigerating liquid is maintained at the desired height in the evaporator by suitable float mechanism 10 and the compressor is automatically controlled to maintain the temperature of the refrigerant substantially uniform. The boiler is preferably submerged in the liquid in order to compensate for heat absorbtion through the tank insulation. The evaporator or boiler may also be positioned outside of the tank 1 and suitably insulated, if desired.

Water or other liquid is supplied to the tank 1 through the supply pipe 3 which connects with one end of the liquid cooling coil 4 that is positioned within the evaporator 2. The discharge end of the cooling coil 4 is connected to the casing 11 of the thermally controlled valve 5 by a pipe 12.

The amount of heat extracted from a liquid in passing through the coil 4 of the evaporator is dependent upon the rate of flow of liquid through the coil as well as upon the temperature of the liquid refrigerant in the evaporator and, in order to insure the cooling of the liquid to a predetermined temperature, before it is discharged into the tank, an automatically operated valve is provided in the casing 11 which is controlled by the temperature of the water flowing from the coil 4 through the pipe 12 to prevent discharge of the water before it is cooled to the desired temperature.

Figure 2:
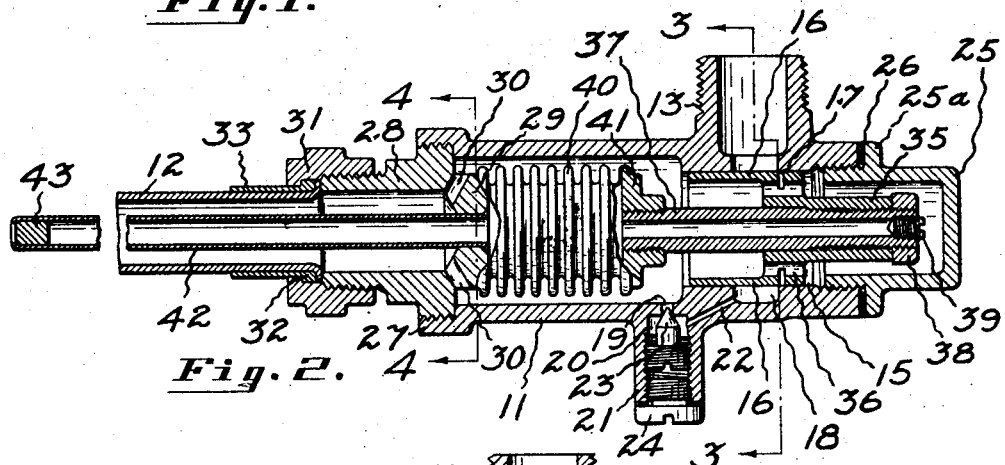
Fig. 2 is a longitudinal section through the automatic controlling valve in the liquid supply pipe.
Figures 3, 4:
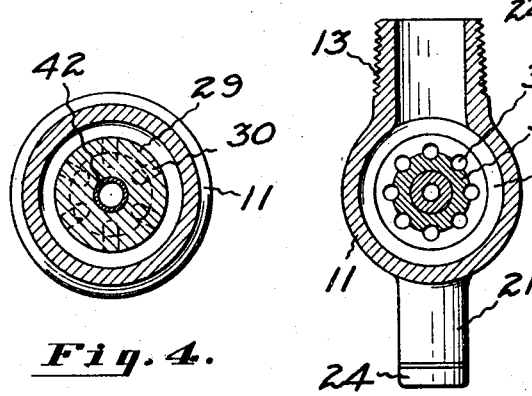
Fig. 3 is a section taken on the line indicated at 3—3 in Fig. 2.
Fig. 4 is a section taken on the line indicated at 4—4 in Fig. 2.

Figs. 2, 3 and 4 are detailed sectional views of the particular control valve 5 that is used in the system. The valve casing 11 is provided with a laterally extended integral nipple 13 to which the discharge pipe 14 that extends from the thermally controlled valve 5 to the float controlled valve 6 is attached. The valve casing has a cylindrical bore 15 in the discharge portion thereof in which is mounted a sliding sleeve valve 16 that is provided with openings 17 near its upper end which, for certain positions of the valve, communicate with an annular groove 18 that is formed in the casing wall. The annular groove 18 opens into the outlet through the nipple 13 so that when the openings 17 register with the annular groove 18, water or other liquid can flow through the casing 11 to the outlet.

For a purpose which will hereinafter be more fully explained, supplemental means is provided for bypassing a small amount of liquid past the valve while the valve is in closed position. To this end, there is provided in the wall of the casing 11, a passage 19 of small diameter leading from the annular groove 18 to a chamber 20 formed in a lateral projection 21 of the casing. The chamber 20 communicates with the interior of the valve casing below the valve 16 through a small opening 22 and the flow of water through the opening 22 is regulated by an adjustable needle valve 23 which may be set to provide the desired rate of leakage past the valve. The projection 21 is bored and tapped to receive the enlarged threaded outer end of the needle valve 23 and the outer end of the threaded opening in the projection is closed by means of a screw plug 24.

The upper end of the valve casing 11 is also internally threaded and is closed by an externally threaded hollow plug 25 which is provided with an annular flange or shoulder 25a which overlies the end of the casing 11 and clamps a suitable packing 26 against the end of the casing.

The valve sleeve 16 is carried on the upper end of a thermally responsive actuating unit that is mounted in the lower internally threaded end portion 27 of the casing 11. The supporting head for the actuating unit is a threaded sleeve 28 which has a head portion 29 of a reduced diameter extending upwardly into the interior of the casing 11. Communication is established between the inside of the sleeve 28 and the interior of the casing 11 through a series of lateral openings 30. The lower end of the sleeve 28 is exteriorly threaded to receive a connector 31 which has an inwardly extending shoulder at its lower end that underlies the lower end of the sleeve 28, thereby providing means for clamping the flanged upper end of connecting pipe 12 to the sleeve 28. A reinforcing sleeve 32 having an outwardly flanged upper end is clamped between the lower end of the connector 31 and the flanged end of pipe 12 to reinforce the connection and to provide a fluid tight union between the parts.

The sleeve valve 16 has a central hub 35 which projects upwardly into the hollow plug 25. A series of axially extending openings 36 that communicate with the transverse valve openings 17 of the valve sleeve are provided between the outer sleeve portion of the valve and the hub 35. The hub 35 of the valve has an axial bore which is interiorly screw threaded to receive a tubular valve stem 37 which is screwed into the hub 35 and locked by means of a nut 38 screwed onto the upper end of the valve stem and engaging the upper end of the hub 35.

The tubular valve stem 37 forms the upper end of a liquid containing chamber that is closed by means of a plug 39. A tubular bellows 40 of resilient material such as sheet metal has a fluid tight connection at its lower end to the head 29 from which it is supported and, at its upper end, has a fluid tight connection to a head 41, which is secured to the lower end of the valve stem 37. The head 29 is provided with an axial opening of a diameter considerably smaller than the diameter of the bore of the lower portion of the sleeve 28. A small pipe 42 has its upper end secured in this opening and is arranged to extend a considerable distance down into the pipe 12. The lower end of the tube 42 is closed by a plug 43. The tubular valve stem 37, the bellows 40 and the tube 42 together form an elongated closed chamber which is filled with a liquid having a relatively high coefficient of expansion such as toluene. The bellows 40 forms an expansible section for the thermally responsive liquid containing chamber so that, upon expansion and contraction of the liquid within this chamber, the bellows 40 is expanded and contracted and the valve 16 raised and lowered by the movement of the head 41. The temperature of the thermally responsive liquid will be substantially that of the liquid passing through the pipe 12 and the valve casing. The thermally responsive expansible valve actuating means is so adjusted that when the temperature of the liquid in the valve chamber surrounding the bellows 40 and pipe 42 is above a predetermined temperature, the valve 16 is held in a position in which the openings 17 are above the annular groove 18 of the valve casing and flow of liquid through the valve chamber is prevented. When, however, the temperature of the liquid delivered through the pipe 12 drops below the above mentioned predetermined temperature, the volume of the thermostat liquid decreases, collapsing the bellows 40 and moving the valve 16 down to a position in which the openings 17 of the valve sleeve register with the casing groove 18, thereby permitting free flow of liquid through the chamber. As long as the temperature remains below the predetermined critical temperature, the water will continue to flow, but whenever the temperature of the water flowing through the valve chamber 11 increases, the thermostat liquid will expand and move the valve 16 toward closed position.

If the water in the tank 1 stands for a considerable time before it is drawn off, its temperature may rise slightly above that of the refrigerant liquid in the evaporator 2, and above the temperature at which the liquid is permitted to pass through the control valve. If, under these conditions, the tank should be emptied or partially emptied, the temperature of the liquid within the casing 11 and pipe 12 might be high enough to maintain the valve 16 in closed position. However, the bypass controlled by the needle valve 23 permits the water to slowly flow through the casing 11 so that the water in the pipe 12 and casing 11 is replaced by colder liquid from the coil 4, which is at a temperature low enough to cause collapsing movement of the bellows 40. This opens the valve 16 and permits free passage of water into the tank to replace that which has been withdrawn from the tank up to the full capacity of the refrigerating unit. If water flows through the cooling coil faster than it can be properly cooled, the valve 16 throttles it down until it is of the proper temperature. In this manner, the refrigerating machinery is caused to operate at full capacity until the tank 1 is completely filled.

It will be apparent that the capacity of the evaporator 2 may be much less than that which would be required for direct cooling of water or other liquid flowing through a pipe to the point of use. It will also be apparent that the temperature of the refrigerating liquid in the evaporator may be maintained at a definite temperature of less range than the range of operation of the refrigerating mechanism. The liquid can also be maintained at a temperature sufficiently above the freezing temperature of the liquid being cooled so that even though the liquid remains stagnant in the coils 4 for a considerable period of time, there is no danger of freezing of liquid in the coils so long as the refrigerating machinery operates.

Furthermore, it is to be understood that the particular form of apparatus shown and described, and the particular procedure set forth, are presented for purposes of explanation and illustration and that various modifications of said apparatus and procedure can be made without departing from my invention as defined in the appended claims.

What I claim is:

1. The combination with a liquid storage tank, of a liquid supply line delivering into the tank, means for cooling liquid during its passage through said supply line, and a thermally controlled valve in said liquid supply line sensitive to variations in the temperature of the liquid in the portion of said line between the cooling means and the discharge point for regulating the flow through said supply line to the tank.

2. The combination with a liquid storage tank, of a liquid supply line delivering into the tank, means for cooling liquid during its passage through said supply line, a valve in said liquid supply line between the cooling means and the discharge end of the line for controlling the delivery of liquid to the tank, an actuating means for said valve responsive to variations to the temperature of liquid in the line for closing the valve when the liquid is above the predetermined temperature and opening the valve when the liquid is below the predetermined temperature.

3. The combination with a liquid storage tank, of a liquid supply line delivering into the tank, means for cooling liquid during its passage through said supply line, a valve in said line between said cooling means and the discharge end of the line having actuating means movable in response to variations in the temperature of the liquid in the line for closing the valve when the liquid is above a predetermined temperature and for opening the valve when the liquid is below said predetermined temperature, and a by-pass for permitting a limited flow of liquid past said valve when the same is closed.

4. A liquid cooling system comprising a liquid storage tank, an evaporator containing a refrigerating liquid, a liquid supply line having a coil within said evaporator and an outlet within the tank, and a valve in said liquid supply line between the evaporator and outlet having an actuating means responsive to variations in the temperature of the liquid in said supply line.

5. A liquid cooling system comprising a liquid storage tank, an evaporator containing a refrigerating liquid, a liquid supply line having a coil within said evaporator and an outlet within the tank, and means including a thermally controlled valve in said supply line for closing said line when liquid in said line is above a predetermined temperature and opening said line when the liquid in the line is below a predetermined temperature.

6. A liquid cooling system comprising a liquid storage tank, an evaporator containing a refrigerating liquid mounted within said tank, a liquid supply line having a coil within said evaporator and an outlet within the tank adjacent the top thereof, a valve within the liquid supply line adjacent the outlet, and thermally responsive actuating means for said valve within the liquid supply line arranged to close said valve upon a rise in temperature of the liquid in the line above a predetermined temperature and to open said valve upon a drop in the temperature of the liquid below said predetermined temperature.

7. A liquid cooling system comprising a liquid storage tank, an evaporator containing a refrigerating liquid mounted within said tank, a liquid supply line having a coil within said evaporator and an outlet within the tank adjacent the top thereof, a valve within the liquid supply line adjacent the outlet, thermally responsive actuating means for said valve within the liquid supply line arranged to close said valve upon a rise in temperature of the liquid in the line above a predetermined temperature and to open said valve upon a drop in the temperature of the liquid below said predetermined temperature, and a by-pass to permit a slight flow of liquid past said valve while said valve is closed.

8. In a liquid supply system, the combination with a liquid supply line and a device for cooling liquid during its passage through said line, of means for automatically maintaining a rate of flow of liquid through said line to its outlet in accordance with the capacity of the cooling device and for discharging the liquid at a substantially uniform temperature comprising a flow regulating device disposed adjacent to said outlet and a thermostatically operated device for controlling said regulating device, said thermostatic device being sensitive to variations in the temperature of the liquid between the cooling device and said outlet and being operatively connected to said regulating device to actuate the same to increase the rate of flow when the temperature of the liquid falls below a predetermined temperature and to decrease the rate of flow upon a rise in temperature of the liquid.

9. In a liquid supply system, the combination with a liquid supply line and a device for cooling liquid during its passage through said line, of means for automatically maintaining a rate of flow of liquid through said line to said outlet in accordance with the capacity of the cooling device and for discharging the liquid at a substantially uniform temperature comprising a valve controlling the flow through said outlet and a thermostatically controlled actuator for said valve sensitive to variations in the temperature of the liquid between the cooling device and outlet, said actuator being connected to the valve to impart an opening movement thereto when the temperature of the liquid falls below a predetermined temperature and to impart a closing movement thereto upon a rise in the temperature of the liquid.

10. In a liquid delivery system, the combination with a liquid supply line having an outlet and a heat interchanging device for varying the temperature of the liquid during its passage through the line, of means for automatically maintaining a rate of flow of liquid through said line in accordance with the capacity of the heat interchanging device and for discharging the liquid at substantially uniform temperature comprising a flow regulating device and a thermostatically operated device for controlling said regulating device, said thermostatic device being sensitive to variations in the temperature of the liquid between the heat interchanging device and outlet and operatively connected to said regulating device to actuate the same to increase the rate of flow upon a variation in the temperature of the liquid from a predetermined temperature in the direction in which the temperature thereof is varied by the heat interchanging device and to decrease the rate of flow upon an opposite variation of the temperature of the liquid.

11. In a liquid delivery system, the combination with a liquid supply line having an outlet and a heat interchanging device for varying the temperature of the liquid during its passage through the line, of means for automatically maintaining a rate of flow of liquid through said line in accordance with the capacity of the heat interchanging device and for discharging the liquid at substantially uniform temperature comprising a valve in said line between the heat interchanging device and outlet and a thermostatic actuator for said valve which is sensitive to variations in the temperature of the liquid between the heat interchanging device and outlet and which is operatively connected to the valve to impart an opening movement thereto upon a variation of the temperature of the liquid from a predetermined temperature in the direction in which the temperature is varied by the heat interchanging device and to impart a closing movement to the valve upon an opposite variation of the temperature of the liquid.

12. In a liquid delivery system, the combination with a liquid supply line having an outlet and a heat interchanging device for varying the temperature of the liquid during its passage through the line, of a thermostatic device positioned adjacent to said outlet and being responsive to variations in the temperature of the liquid between the heat interchanging device and the outlet for automatically varying the rate of flow through the heat interchanging device substantially in accordance with the rate of heat transfer.

13. In a liquid delivery system, the combination with a liquid supply line having an outlet and a heat interchanging device for varying the temperature of the liquid during its passage through the line, of means for automatically maintaining the liquid between the heat interchanging device and the outlet at substantially a predetermined temperature comprising thermostatically operated means positioned adjacent to said outlet and being responsive to variations in the temperature of the liquid for varying the rate of flow of liquid through the heat interchanging device to vary the heat transfer per unit of volume of liquid to compensate variations from said predetermined temperature.

In testimony whereof I affix my signature.

HERBERT C. KELLOGG.